3,139,621
SPINNING SOLUTIONS OF SYNTHETIC FIBERS
Floyd D. Stewart, Akron, Ohio, assignor, by mesne assignments, to Celanese Corporation of America, New York, N.Y., a corporation of Delaware
No Drawing. Filed Nov. 4, 1960, Ser. No. 67,157
8 Claims. (Cl. 260—41)

This invention relates to improved spinning dope solutions of hydrophobic synthetic copolymers and polyblends of copolymers whereby said solutions are obtained in a state of increased clarity, transparency, and stability against color formation during ageing. More specifically, the invention relates to improved polyblend spinning solutions of equimolar polymeric vinylidene cyanide: vinyl acetate compositions capable of being converted readily into dyeable general purpose fibers, filaments, films and other forms of shaped articles.

It is well known that polyvinylidene cyanide and various copolymers, terpolymers and interpolymers of vinylidene cyanide and other olefinically unsaturated monomers can be spun into synthetic fibers possessing unusually high strength and other desirable properties. One of the best of these fiber materials is the approximately equimolar copolymer of vinylidene cyanide: vinyl acetate which is further described in U.S. Patent No. 2,615,866.

To be of value of the trade, however, any synthetic fiber produced must be readily and successfully dyeable, preferably with the dyes and techniques currently in use in the dyeing art. Like many hydrophobic synthetic fibers and filaments, those made from vinylidene cyanide interpolymers have slick, smooth surfaces and are resistant to penetration by ordinary dyestuffs. Further, these polymeric fibers offer a minimum of points or molecular groups to which dye molecules may become affixed.

An object of this invention is to provide equimolar vinylidene cyanide: vinyl acetate copolymer polyblend solutions which have the chemical and physical properties of equimolar vinylidene cyanide: vinyl acetate copolymer and which are completely receptive to disperse dyes. A further object is to produce these polyblend solutions in a state of clarity and transparency before spinning which will contribute to improved dyeing.

The objects of this invention are accomplished by blending equimolar vinylidene cyanide: vinyl acetate copolymer, preferably at the spinning stage, with polymerized N,N-dimethylacrylamide, i.e. a homopolymer or copolymer thereof, to form a polyblend which can be spun into general purpose fibers that readily accept commercial dyes.

The equimolar vinylidene cyanide: vinyl acetate copolymer which is the basis of the textiles of this invention is prepared in filament, fiber, fabric or film form according to the teachings of U.S. Patent No. 2,615,866 which are incorporated herein by reference. As produced under the teachings of this patent, however, the vinylidene cyanide: vinyl acetate copolymer filaments are not readily dyeable because of inherent hydrophobicity and lack of reactive dye sites along the copolymer chain. Some success in dyeing has been experienced by adding certain carriers or swelling agents to the dye baths to promote swelling of the fabric and sorption of the dye, and by treating the copolymer with a dilute aqueous amine before dyeing, but these procedures still often fail to produce a satisfactorily dyed commercially usable end product without undue expense.

Introduction of hydrophilic and reactive materials into vinylidene cyanide: vinyl acetate copolymer can be accomplished by placing hydrophilic materials in the copolymer during polymerization to give terpolymers reactive to dyes, or by adding hydrophilic polymers and polymers having reactive groups to the vinylidene cyanide: vinyl acetate fiber spinning dopes to give polyblends containing reactive sites. Great care must be used in doing this however, for it is known in the art that vinylidene cyanide monomer tends ot homopolymerize in the presence of water or basic monomers. Therefore any extra basic groups must be added after the vinylidene cyanide: vinyl acetate copolymer has been formed, that is, they must be added either in the spinning solutions or by treatment of finished fibers.

The process of this invention is to prepare homopolymer or copolymers of a certain nitrogen-containing, basic compound which are compatible with vinylidene cyanide: vinyl acetate copolymer in that while physical properties of the base fiber are not harmed it becomes more reactive to various dyestuffs than the standard copolymer fibers, while production costs are not excessively increased.

It has been found especially advantageous to form a polyblend of equimolar vinylidene cyanide: vinyl acetate copolymer and a homopolymer or copolymer of N,N-dimethylacrylamide. The latter compound is produced by pyroslysis of the reaction product of beta-propiolactone and dimethyl amine, as described in U.S. Patent No. 2,548,155.

For the purposes of this invention it seems to be the N,N-dimethylacrylamide moiety of the polyblend which leads to the development of satisfactory dyeing of the vinylidene cyanide: vinyl acetate fibers. Any comonomer which may be present with the N,N-dimethylacylamide seems to act merely as a diluent.

N,N-dimethylacrylamide homopolymer and copolymers, as will be shown below, do introduce the desired hydrophilicity and dye reactive sites to the vinylidene cyanide: vinyl acetate copolymer to allow satisfactory dyeing with disperse dyes. It is surprising that N,N-dimethylacylamide is the only acrylamide compound employable in the practice of this invention. Acrylamide, N-methylacrylamide, N-tertiarybutylarcrylamide, and N,N-diethylacrylamide, for instance, and their copolymers are all ineffective to produce the desired dyeability. In the copolymers of N,N-dimethylacrylamide which are employed, it is preferred to keep the weight ratio of dimethylacrylamide above 40 percent.

Poly-N,N-dimethylacrylamide and copolymers of the monomer with such monoolefinic monomers as vinyl acetate, acrylonitrile, styrene, methyl acrylate and methylmethacrylate may be prepared in solution systems by charging monomers and a free radical catalyst such as benzoyl peroxide to a polymerization bottle or flask containing hexane, heptane, or a similar solvent and equipped for temperature control, agitation and condensation of reaction vapors. Several hours heating and stirring at 50°–70° C. produces a slightly gummy to granular polymer or copolymer that can be filtered, washed and vacuum dried at 40–50° C.

Another method that may be employed to prepare homopolymers and copolymers of N,N-dimethylacrylamide is emulsion polymerization. Monomers may be charged in any ratio from about 40 mol percent dimethylacrylamide 60 mol percent comonomer to 100 mol percent dimethylacrylamide. Demineralized water is used as the reaction medium, sodium bicarbonate as a buffer, Aerosol OT (dioctyl ester of sodium sulphosuccinic acid) as the emulsifier, and ammonium persulfate as the catalyst. The reaction vessel is purged with nitrogen, the reactants are charged, and the polymerization is run at 90° C. for about 6 hours. Fine particle size polymer is filtered, dried in a vacuum dryer at 50° C. washed with hexane, redried in the vacuum drier, and is ready for use in preparing polyblends.

Poly-N,N-dimethylacrylamide and copolymers thereof enable one to produce dyeable vinylidene cyanide:vinyl acetate copolymer fibers by polyblending techniques.

Polyblends of the polymers and copolymers of this invention are prepared by incorporating the desired materials into a common spinning solvent such as dimethylformamide, acetonitrile, or acetonitrile-water azeotrope. Polymer polyblend solutions are usually prepared with the vinylidene cyanide:vinyl acetate copolymer comprising 85 to 96 percent by weight of the polymer present. Gently rolling the mixture for several hours at room temperature usually effects the formation of a homogeneous solution, but the process can of course be hastened by application of mild heat.

The amount of N,N-dimethylacrylamide in the polyblend may be varied in two ways. If a single homopolymer or copolymer is being used as the polyblending additive, the parts by weight of that material may be increased or decreased. Another way to vary the amount of poly N,N-dimethylacrylamide is to use copolymers containing different amounts of N,N-dimethlyacrylamide by weight, but it is not desirable to use copolymers containing less than about 40 percent by weight of N,N-dimethylacrylamide for these materials do not seem to form satisfactory polyblend solutions nor give satisfactory dyeing results.

In forming the polyblend mixtures of this invention it has been found that as little as 4% by weight of N,N-dimethylacrylamide, in the form of a polymer, polyblended with 96% by weight of equimolar vinylidene cyanide:vinyl acetate copolymer gives significant improvement in the disperse dyeing of fibers formed from the polyblend with no noticeable change in fiber properties such as tensile and elongation when compared with those of fibers made from unpolyblended vinylidine cyanide:vinyl acetate. The maximum amount of polymerized N,N-dimethylacrylamide containing at least 40 weight percent N,N-dimethylacrylamide that can be used in the polyblend is about 15 percent by weight. If more additive polymer than this is present, fiber properties generally become too poor for the fibers to be useful. In preparing the polyblends of this invention I often find it advantageous to use a copolymer of N,N-dimethylacrylamide instead of the homopolymer. N,N-dimethylacrylamide copolymers can be made either in suspension or emulsion systems as described above with from 100/0 mol percent N,N-dimethylacrylamide/comonomer to 40/60 mol percent N,N-dimethylacrylamide/comonomer being charged. I have found it preferable to use copolymers containing a minimum of 40 weight percent N,N-dimethylacrylamide with 70 to 75 percent being most preferred. When copolymers are used to prepare the polyblends, they are added on the basis of the N,N-dimethylacrylamide content, for example 5 weight percent of N,N-dimethylacrylamide homopolymer is equivalent in a polyblend with equimolar vinylidene cyanide:vinyl acetate to 10 weight percent of a 50/50 weight percent copolymer of N,N-dimethylacrylamide and to 7.5 weight percent of a 75/25 weight percent copolymer of N,N-dimethylacrylamide. When about 7.5 to 9.0 weight percent N,N-dimethylacrylamide is present in the polyblend, generally excellent dyeings of polyblend fibers are obtained with disperse dyes.

The spinning solutions can be conveniently wet-spun into fibers by pumping the solution through a spinneret into a bath comprised of water and the solvent employed to form the spinning solution. The polyblend fibers are washed, stretched, relaxed, and dried—all steps familiar to those versed in the art. The fibers are stretched in drawing to obtain best orientation and greatest strength in the fiber by drawing them to just below the breaking point, usually a ratio of about 4 or 5 to 1. Standard dyeing techniques then suffice to apply the disperse dyes to the fibers.

Dyeability is evaluated in two ways—on films cast from polyblend solutions, and on fibers extruded from the solutions. A typical polyblend film is prepared by making a 10 to 15 percent total solids by weight mixture of blended polymers in acetonitrile-water azeotrope mixture (85.0% acetonitrile-15% water) and holding with occasional stirring at 70° C. on a water bath until a smooth, bubble free solution is obtained. A ⅛" thick glass plate about 12" wide is placed on a hot plate and a doctor knife is arranged with 0.01" clearance above the glass. When the glass temperature is about 50° C., the viscous polymer solution is poured across the breadth of the plate and then pulled the length of the plate by the doctor knife. After ten minutes the plate and film are set aside to cool, and thirty minutes later the film can be gently stripped from the plate and dried.

Fiber and film samples are dyed for evaluation as follows in infinite and finite dyebaths. In the infinite dyebath a sample consisting of 0.12 gram of fiber, or a 3 inch by 2 inch piece of film (0.01" thick) is placed in a bath containing 600 ml. of water and 300% dyestuff on weight of polymer present. The bath is held at the boil for 1 hour, and then the sample is scoured at 160° F. with 2% N-methyl-oleoyl-taurate (Na salt) and rinsed with perchloroethylene until the rinse fluid runs clear. In the finite dyebath the liquor to fiber ratio is maintained at 40:1 and a concentration of dye equal to 5% by weight on the fiber is used. Dyeing is at the boil for one hour. Scouring and rinsing steps are the same as for the infinite dyebath.

The amount of dye taken up by the fiber sample is calculated for both infinite and finite dyeing by dissolving 0.1 gram of the dyed fiber in 100 ml. dimethyl formamide and comparing the light transmissivity of this test solution with a standard solution as follows: Solutions of the same dyestuff of known strength are checked for optical density in a Bausch and Lomb Spectronic 20 colorimeter by reading percent light transmission at several wavelengths of light until that wavelength is located where maximum absorption (minimum transmission) occurs. These optical densities for various concentrations of dyes are then plotted versus the concentrations of dye and when the optical density of a dyed sample is determined at the same wavelength of transmitted light, the graph informs us of the dye concentration that is on the sample. This is reported as milligrams of dyestuff per milligram of fiber.

To obtain the amount of dye on a dyed piece of film, a one inch square piece is cut out of the dyed film, dissolved in 100 ml. of dimethyl formamide and checked for optical transmission. The amount of dye on the film is reported as milligrams of dyestuff per 12.9 sq. cm. of film (the area of both sides of the piece of film).

Examples are given below to illustrate, but not to limit, the scope of this invention. Parts and percentages are given on a weight basis unless otherwise indicated.

EXAMPLE I

N,N-dimethylacrylamide was copolymerized separately with various monomers by charging monomers into a three-necked flask equipped for agitation, reflux and temperature control. Benzene was used as solvent and a free radical catalyst was employed to trigger the polymerization. Monomers, catalyst proportion, temperature and time of polymerization are set forth in Table I below. Weights are given in grams. Comonomers were charged at the rate of 50 mol percent each.

Table I

| Monomer | A | B | C | D |
|---|---|---|---|---|
| N,N-dimethyl acrylamide | 4.96 | 2.48 | 2.48 | 2.48 |
| Vinyl acetate | | 2.15 | | |
| Methyl methacrylate | | | 2.50 | |
| Acrylonitrile | | | | 1.32 |
| Benzene | 22.9 | 22.9 | 22.9 | 22.9 |
| 50X 2,4-dichloro-benzoyl peroxide | 0.03 | 0.208 | 0.03 | 0.023 |
| Temperature, °C | 60 | 60 | 60 | 60 |
| Time, hours | 6 | 24 | 24 | 24 |
| Soluble in DMF | Yes | Yes | Yes | Yes |
| Soluble in water | Yes | No | No | No |
| Weight percent NNDMA (based on $N_2$ analyses) | 100.0 | 69.6 | 41.3 | |

Polyblend spinning dopes were prepared by mixing 90 parts of an equimolar vinylidene cyanide:vinyl acetate copolymer prepared under the teachings of U.S. Patent 2,615,866 and 10 parts of N,N-dimethylacrylamide copolymer as prepared above. Spinning dopes were made in dimethylformamide by warming the solutions overnight on a roller mill. The dopes were extruded through multi-hole spinnerets into a DMF-water coagulating bath, washed, stretched, relaxed and dried according to steps known in the art. Finally, 0.1 gram of each polyblend fiber was separately dyed in an infinite disperse dyebath containing Celanthrene Blue dyestuff, designated as "Disperse Blue 1" in Part I and as No. 64500 in Part II of the Colour Index, Second Edition. All of the samples took up much greater amounts of the dye than did control samples of unpolyblended vinylidene cyanide:vinyl acetate copolymer fiber.

EXAMPLE II

As in Example I, a copolymer of N,N-dimethylacrylamide:vinyl acetate was prepared. The copolymer contained 77% N,N-dimethylacrylamide and 23% vinyl acetate by weight and was polyblended in various proportions with equimolar vinylidene cyanide:vinyl acetate copolymer by dissolving the two copolymers in acetonitrile. Uniform, transparent fibers were extruded from the acetonitrile polyblend solution by passing it through a spinneret into a water-acetonitrile spinning bath. These fibers were dyed at the boil in infinite and finite disperse dyebaths for one hour. Physical and dyeing data on the samples are set forth in Table II.

DYEBATHS

| | Infinite | Finite |
|---|---|---|
| Dyestuff | Celliton Fast Pink BACF. | Eastman Blue BNN. |
| Dyestuff, amount in g | 0.3 | 0.25. |
| Fiber, weight in g | 0.1 | 5.0. |
| Water, volume in ml | 600.0 | 200.0 (40:1 ratio). |

All of the polyblend samples take up much greater amounts of dye than the vinylidene cyanide:vinyl acetate control.

Table II

| Blend Composition, wt. percent $V(CN)_2$:VOAC/wt. percent NNDMA:VOAC | Wt. percent NNDMA of Blend | Fiber Properties | | Infinite Dyebath Disperse, Celliton Fast Pink BACF, mg. dye/mg. fiber | Finite Dyebath Disperse, Eastman Blue BNN, mg. dye/mg. fiber |
|---|---|---|---|---|---|
| | | Denier wt. in grams of 9000 meters | Tensile, Gram/Denier | | |
| 100/0 (control) | 0.0 | 3.30 | 2.48 | 0.28 | 0.31 |
| 90/10 | 7.75 | 3.54 | 2.45 | 3.36 | 3.76 |
| 88/12 | 9.20 | 3.30 | 2.50 | 5.31 | |

$V(CN)_2$ = vinylidene cyanide. NNDMA = N,N-dimethylacrylamide. VOAC = vinyl acetate.

EXAMPLE III

A series of copolymers containing varying proportions of N,N-dimethylacrylamide and vinyl acetate were prepared using the procedure of Example I. These copolymers were separately polyblended with equimolar vinylidene cyanide:vinyl acetate copolymer at approximately the same weight ratio. Dyeing evaluations, listed in Table III show that when the amount of N,N-dimethylacrylamide in the polyblend is increased by increasing the concentration of N,N-dimethylacrylamide in the additive copolymer, the range of about 77 weight percent to 100 weight percent N,N-dimethylacrylamide is superior to the level of 50 weight percent. The amount of N,N-dimethylacrylamide can be increased to the maximum of 15 weight percent either by using a higher percent N,N-dimethylacrylamide in the copolymer, or by increasing the amount used of a given copolymer.

Table III

| Blend Composition, wt. percent $V(CN)_2$:VOAC/wt. percent NNDMA:VOAC | Wt. percent NNDMA in the Blend | Composition of addition polymer, wt. percent NNDMA/wt. percent VOAC | Fiber Properties | | Infinite Dyebath Disperse, Celliton Fast Pink BACF, mg. dye/mg. fiber |
|---|---|---|---|---|---|
| | | | Denier wt. in grams of 9000 meters | Tensile, Gram/Denier | |
| 91.0/9.0 | 9.0 | 100.0/0.00 | 3.60 | 2.49 | 3.11 |
| 90.3/9.7 | 7.5 | 77.0/23.0 | 3.96 | 2.48 | 3.35 |
| 91.0/9.0 | 4.6 | 50.7/49.3 | 3.88 | 2.16 | 1.49 |

EXAMPLE IV

Using the procedure of Example I, copolymers of varying proportions of N-tertiary-butylacrylamide:vinyl acetate were prepared. Polyblend solutions containing 90 parts equimolar vinylidene cyanide:vinyl acetate and 10 parts of the various acrylamide copolymers were prepared. Fibers were spun, dyed and evaluated to present the data in Table IV.

Table IV

| Poly Blend Compositions, wt. percent V(CN)₂:VOAC/wt. percent NTBA: VOAC | Blending copolymer, wt. percent NTBA/wt. percent VOAC | Wt. percent NTBA in Blend | Fiber Properties | | Infinite Dyebath Disperse, Celliton Fast Pink BACF, mg. dye/mg. fiber | Finite Dyebath Disperse, Eastman Blue BNN, mg. dye/mg. fiber |
|---|---|---|---|---|---|---|
| | | | Denier, g./900 meters | Tensile, g./Denier | | |
| 100/0 (control) | | 0.0 | 3.30 | 2.28 | 0.28 | 0.31 |
| 90/10 | 40.1/59.9 | 4.0 | 3.66 | 2.14 | 0.49 | 0.50 |
| 90/10 | 55.2/44.8 | 5.6 | 3.38 | 2.24 | 0.51 | 0.56 |
| 90/10 | 77.7/22.3 | 8.0 | 4.18 | 1.83 | 0.55 | 0.48 |
| 90/10 | 83.7/16.3 | 8.3 | 3.69 | 2.14 | 0.52 | 0.54 |

V(CN)₂=vinylidene cyanide. NTBA=N-tertiarybutylacrylamide. VOAC=vinylacetate.

The polyblends do not take up much more dyestuff than the control even when the amount of N-tertiarybutylacryamide is increased by 100 percent.

When polymers and copolymers of acrylamide and N-methylacrylamide were made by the procedure of Example I and polyblended with equimolar vinylidene cyanide:vinyl acetate copolymer, the polyblends were not soluble and satisfactory fiber and film samples could not be made. The homopolymer of N,N-diethylacrylamide and two copolymers of it with vinyl acetate containing 50% and 75% by weight N,N-diethylacrylamide were prepared, polyblended with equimolar vinylidene cyanide:vinyl acetate copolymer at the ratio 10/90 and dyed in Celliton Fast Pink BACF dyestuff, but the dyeings were uniformly poor. The conclusion can be drawn that the action of N,N-dimethylacrylamide is unique in the process of this invention.

EXAMPLE V

Using the procedure of Example I, a copolymer of N,N-dimethylacrylamide:vinyl acetate was made. It analyzed 74.5% NNDMA by weight. A polyblend of equimolar vinylidene cyanide:vinyl acetate copolymer and the copolymer prepared here was made up in the weight ratio 90/10. Fifteen grams of this polyblend were dissolved in 85 grams of acetonitrile water azeotrope, cast on a glass plate at 50° C. and drawn into a wet film 0.01" thick by a doctor knife. This polyblend film contained 7.45% by weight of NNDMA. When dyed in a Celliton Fast Pink BACF disperse infinite dyebath for one hour at the boil, a one-inch square piece of the film was found to have taken up 1.36 mg. dye on 12.9 cm.² whereas a control film prepared from equimolar vinylidene cyanide:vinyl acetate copolymer and dyed with the same procedures, picked up only 0.134 mg./12.9 cm.². Any value above 1.0 mg./12/9 cm.² is accepted as satisfactory dyeing.

The Colour Index, Second Edition, designations of "Celliton Fast Pink BACF" are "Disperse Red 15" in Part I and No. 60710 in Part II, and of "Eastman Blue BNN" are "Disperse Blue 3" in Part I and No. 61505 in Part II.

The embodiments of the invention in which an exclusive property or privilege is claimed are defined as follows.

I claim:
1. A composition of matter consisting essentially of a substantially uniform blend of 85 to 96 percent by weight of approximately equimolar vinylidene cyanide:vinyl acetate copolymer with 15 to 4 percent by weight of polymerized N,N-dimethylacrylamide.

2. A composition of matter consisting essentially of a substantially uniform blend of 85 to 96 percent by weight of approximately equimolar vinylidene cyanide:vinyl acetate copolymer with 15 to 4 percent by weight of an additive polymeric material containing at least 40 weight percent of N,N-dimethylacrylamide monomer units and from 0 to 60 weight percent of monomer units of a different monoolefinic monomer copolymerizable with N,N-dimethylacrylamide, said additive polymeric material being present in a minimum amount that guarantees that at least 4 weight percent of the total blend will consist of N,N-dimethylacrylamide monomer units.

3. A composition of matter consisting essentially of 85 to 96 percent by weight of approximately equimolar vinylidene cyanide:vinyl acetate copolymer blended with 15 to 4 percent by weight of N,N-dimethylacrylamide:vinyl acetate copolymer wherein the N,N-dimethylacrylamide is present in an amount equal to at least 40 weight percent, the amout of said copolymer being such that at least 4 weight percent of the total mixture will be N,N-dimethylacrylamide monomer units.

4. A composition of matter consisting essentially of 85 to 96 percent by weight of approximately equimolar vinylidene cyanide:vinyl acetate copolymer with 15 to 4 percent by weight of N,N-dimethylacrylamide:acrylonitrile copolymer wherein the N,N-dimethylacrylamide is present in an amount equal to at least 40 weight percent, the amount of said copolymer being such that at least 4 weight percent of the total mixture will be N,N-dimethylacrylamide monomer units.

5. A method of forming a dyed plastic mixture comprising blending 85 to 96 percent by weight of an approximately equimolar vinylidene cyanide:vinyl acetate copolymer with from 15 to 4 percent by weight of polymerized N,N-dimethylacrylamide, and treating said blended materials with a disperse dye.

6. A method of forming a dyed plastic mixture comprising blending 85 to 96 percent by weight of approximately equimolar vinylidene cyanide:vinyl acetate copolymer with 15 to 4 percent by weight of a polymer containing at least 40 weight percent of N,N-dimethylacrylamide monomer units and from 0 to 60 weight percent of monomer units of a different monoolefinic monomer copolymerizable with N,N-dimethylacrylamide, said polymer being present in a minimum amount that guarantees that at least 4 weight percent of the total blend will consist of N,N-dimethylacrylamide monomer units, and treating said blended materials with a disperse dye.

7. A method of forming a dyed plastic mixture comprising blending 85 to 96 percent by weight of approximately equimolar vinylidene cyanide:vinyl acetate copolymer with from 15 to 4 percent by weight of N,N-dimethylacrylamide:vinyl acetate copolymer wherein the N,N-dimethylacrylamide is present in an amount equal to at least 40 weight percent and the weight percent of vinyl acetate in said copolymer and the total amount of said copolymer are selected in such a manner that at least 4 percent of the total blend will consist of units derived from N,N-dimethylacrylamide, and treating said blended materials with a disperse dye.

8. Disperse dyed filamentary material comprising a substantially uniform blend of 85 to 96 percent by weight of approximately equimolar vinylidene cyanide:vinyl acetate copolymer with 15 to 4 percent by weight of polymerized N,N-dimethylacrylamide.

References Cited in the file of this patent

UNITED STATES PATENTS

| | | |
|---|---|---|
| 2,615,866 | Gilbert et al. | Oct. 28, 1952 |
| 2,831,826 | Coover et al. | Apr. 22, 1958 |
| 2,921,831 | Sommar | Jan. 19, 1960 |

FOREIGN PATENTS

| | | |
|---|---|---|
| 725,569 | Great Britain | Mar. 9, 1955 |
| 561,658 | Canada | Aug. 12, 1958 |
| 557,251 | Canada | May 13, 1958 |